United States Patent
Yoshida (10) Patent No.: US 9,787,084 B2
(45) Date of Patent: Oct. 10, 2017

(54) MOTOR DRIVING DEVICE

(71) Applicant: FANUC CORPORATION, Yamanashi (JP)

(72) Inventor: Tomokazu Yoshida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/183,881

(22) Filed: Jun. 16, 2016

(65) Prior Publication Data
US 2016/0380571 A1    Dec. 29, 2016

(30) Foreign Application Priority Data

Jun. 29, 2015    (JP) .................................. 2015-130040

(51) Int. Cl.
| | |
|---|---|
| *H02P 27/04* | (2016.01) |
| *H02H 7/12* | (2006.01) |
| *H02M 7/06* | (2006.01) |

(52) U.S. Cl.
CPC .......... *H02H 7/1216* (2013.01); *H02M 7/062* (2013.01); *H02P 2201/03* (2013.01)

(58) Field of Classification Search
CPC .. H02P 21/141; H02P 21/146; H02P 21/0035; H02P 21/06; H02P 27/08; H02M 5/271; H02M 7/53875
USPC ................................. 318/727, 798, 800, 801
See application file for complete search history.

(56) References Cited

U.S. PATENT DOCUMENTS

| | | | | |
|---|---|---|---|---|
| 5,804,973 | A * | 9/1998 | Shinohara ........... | B60L 11/1807 324/537 |
| 6,533,074 | B2 * | 3/2003 | Tominaga ................ | B66B 1/30 187/290 |
| 7,135,835 | B2 * | 11/2006 | Yamada .................. | H02P 23/06 318/800 |

(Continued)

FOREIGN PATENT DOCUMENTS

| | | |
|---|---|---|
| JP | H8317660 A | 11/1996 |
| JP | H9140051 A | 5/1997 |

OTHER PUBLICATIONS

English Abstract for Japanese Publication No. JPH09140051 A, published May 27, 1997, 2 pgs.

(Continued)

*Primary Examiner* — Rina Duda
(74) *Attorney, Agent, or Firm* — Fredrikson & Byron, P.A.

(57) ABSTRACT

A motor driving device includes: a converter that converts AC power into DC power; a DC link capacitor provided for the DC link; an inverter that converts DC power into AC power for a motor; an initial charging circuit that charges the DC link capacitor; a potential difference determination unit that determines a potential difference between both ends of the initial charging circuit; a direct current detecting unit that detects direct current supplied to the initial charging circuit; an alternating current detecting unit that detects alternating current supplied to a motor; and an abnormality determination unit that determines that abnormal heat generation occurs in the initial charging circuit when the alternating current detecting unit detects alternating current and the direct current detecting unit detects direct current, in a case in which a potential difference occurs between both of the ends of the initial charging circuit.

2 Claims, 6 Drawing Sheets

(56) References Cited

U.S. PATENT DOCUMENTS

| | | | |
|---|---|---|---|
| 7,233,465 B2* | 6/2007 | Lee | H02H 3/027 |
| | | | 361/42 |
| 7,505,291 B2* | 3/2009 | Wang | H02M 7/062 |
| | | | 363/15 |
| 7,929,323 B2* | 4/2011 | Schmidt | H02M 7/062 |
| | | | 363/125 |
| 2014/0300298 A1* | 10/2014 | Liu | H02P 3/22 |
| | | | 318/380 |

OTHER PUBLICATIONS

English Abstract for Japanese Publication No. JPH08317660 A, published Nov. 29, 1996, 2 pgs.

* cited by examiner

VOLTAGE OF BOTH ENDS OF DC LINK CAPACITOR

FIG. 2B

DIRECT CURRENT

MOTOR SUPPLY CURRENT

FIG. 2C

DIRECT CURRENT

MOTOR SUPPLY CURRENT

MOTOR ACCELERATION PERIOD

VOLTAGE OF BOTH ENDS
OF CHARGING RESISTANCE

FIG. 7B

VOLTAGE OF BOTH ENDS
OF DC LINK CAPACITOR

MOTOR ACCELERATION PERIOD

FIG. 8A

VOLTAGE OF BOTH ENDS
OF CHARGING RESISTANCE

FIG. 8B

VOLTAGE OF BOTH ENDS
OF DC LINK CAPACITOR

MOTOR ACCELERATION PERIOD

FIG. 9A

VOLTAGE OF BOTH ENDS
OF CHARGING RESISTANCE

FIG. 9B

VOLTAGE OF BOTH ENDS
OF DC LINK CAPACITOR

MOTOR ACCELERATION PERIOD

MOTOR DRIVING DEVICE

BACKGROUND OF THE INVENTION

Field of the Invention

The present invention relates to a motor driving device that converts alternating current power, supplied from an alternating current power source side, into direct current power, outputs the direct current power to a DC link, then further converts the direct current power into alternating current power for driving a motor, and supplies the alternating current power to a motor. In particular, the present invention relates to a motor driving device that can detect abnormal heat generation in an initial charging circuit which charges a DC link capacitor.

Description of the Related Art

In motor driving devices that drive motors in machine tools, press forging machines, injection molding machines, industrial machines, or various robots, alternating current power supplied from an alternating current power source side is temporally converted into direct current power, the direct current power is then further converted into alternating current power, and the alternating current power is used as driving power for a motor disposed to each driving axis. Such a motor driving device includes: a converter (rectifier) that converts (rectifies) alternating current power supplied from an alternating current power source side to output direct current power; and an inverter (invertor) that is connected to a DC link which is in the direct current output side of the converter, and that performs power conversion between direct current power for a DC link and alternating current power which is driving power or regenerative power for a motor. The motor driving device controls the rate or torque of a motor connected to the alternating current side of the inverter, or the position of a rotor.

A DC link capacitor is disposed to a DC link that connects the direct current output side of a converter and the direct current input side of an inverter to each other. The DC link capacitor has a function as a smoothing capacitor for inhibiting the pulsating component of the direct current output of the converter, and a function as a condenser that can accumulate direct current power.

As described in Japanese Unexamined Patent Publication No. H09-140051, it is preferable to put a DC link capacitor on an initial charge (also referred to as "pre-charge") immediately after starting up a motor driving device and before starting driving of a motor (i.e., before start of power conversion operation by inverter unit), and therefore the DC link capacitor is commonly provided with an initial charging circuit for such an initial charge.

Figure 4:
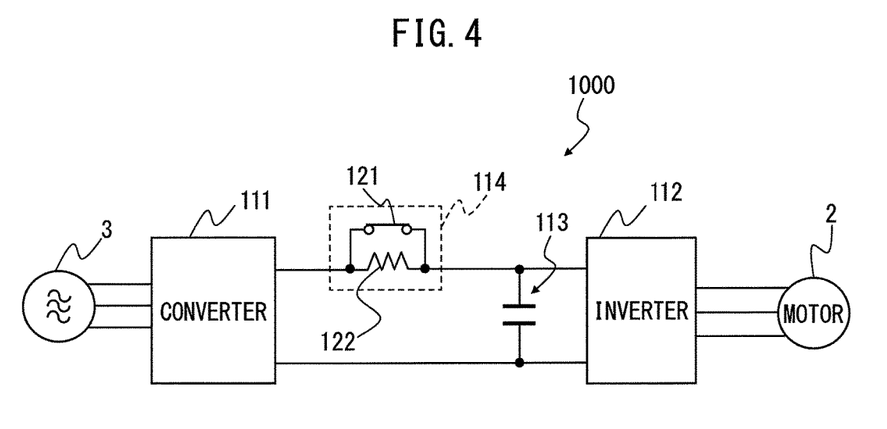
FIG. 4 is a view illustrating the configuration of a common motor driving device.

FIG. 4 is a view illustrating the configuration of a common motor driving device. A motor driving device 1000 includes: a converter 111 that converts alternating current power supplied from a commercial three-phase alternating current power source 3 to output direct current power; and an inverter 112 that is connected to a DC link which is in the direct current output side of the converter 111, and that converts the direct current power output from the converter 111 into alternating current power supplied as driving power for a motor 2 or that converts alternating current power regenerated from the motor 2 into direct current power. The motor driving device 1000 controls the rate or torque of the motor 2 connected to the alternating current side of the inverter 112, or the position of a rotor.

In order to individually supply driving power to motors 2 disposed correspondingly to a plurality of driving axes to control driving of the motors 2, inverters 112, the number of which is equal to the number of the motors 2, are connected in parallel. Each of DC link capacitors 113 is provided for the direct current input side of each inverter 112. In other words, the DC link capacitors 113 are located in the DC link sides, to which such converters 111 are connected, of the inverters 112. As an example, in FIG. 4, the number of the motors 2 is set at three, and therefore the number of inverters 112 is three. In contrast, one converter 111 is often provided for plural inverters 112 for the purpose of reducing the cost and space occupied by the motor driving device 1000.

Large inrush current flows through the converter 111 immediately after starting an initial charge from the state of accumulating no energy in the DC link capacitor 113. In particular, the larger the capacitance of the DC link capacitor 113, the larger the generated inrush current. As a measure against the inrush current, an initial charging circuit 114 is disposed between the converter 111 and the DC link capacitor 113 in the inverter 112 in the motor driving device 1000.

The initial charging circuit 114 includes: a charging resistance 122; and a switch 121 that is connected in parallel to the charging resistance 122 to short-circuit both ends of the charging resistance 122 when the switch 121 is closed. The switch 121 is opened (turned off) only during the period of the initial charge of the DC link capacitor 113 immediately after starting up the motor driving device 1000, and is maintained in the state of being closed (turned on) during the period of normal operation in which the motor driving device 1000 drives the motor 2. More specifically, direct current output from the converter 111 is allowed to flow into the DC link capacitor 113 through the charging resistance 122 to charge the DC link capacitor 113 by opening (turning off) the switch 121 during the period of the initial charge immediately after starting up the motor driving device 1000 and before starting the driving of the motor 2. When the DC link capacitor 113 is charged to a predetermined voltage, the switch 121 is closed (turned on) to short-circuit both of the ends of the charging resistance 122 and to complete initial charge operation. Then, the inverter 112 starts power conversion operation to supply driving power to the motor 2 and to drive the motor 2 based on the driving power.

Because direct current power output from the converter 111 is allowed to flow through the charging resistance 122 and is consumed as heat in the charging resistance 122 by opening (turning off) the switch 121 during the period of the initial charge of the DC link capacitor 113, excessive inrush current is prevented from being generated during the initial charge period. However, the charging resistance 122 has a load capacity defined as a heat quantity at which fusion can be withstood, and the flow of excessive current that exceeds the load capacity through the charging resistance 122 causes the charging resistance 122 to generate abnormal heat and to be fused. Therefore, monitoring of current flowing through the charging resistance 122 and detection of abnormal heat generation are important for protecting the charging resistance 122.

For example, as described in Japanese Unexamined Patent Publication No. H09-140051, there is known a technology including a current sensor for detecting current in itself flowing through a charging resistance, in which abnormality is determined in order to protect the charging resistance when current detected by the current sensor exceeds a predetermined magnitude, during the period of the initial charge of a DC link capacitor.

For example, as described in Japanese Unexamined Patent Publication No. H08-317660, there is known a technology to monitor a potential difference between both ends of a charging resistance, and to determine abnormality in order to protect the charging resistance when a state in which the potential difference is prevented from being a specified value or less continues for longer than a given time, during the period of the initial charge of a DC link capacitor.

Figure 5A:
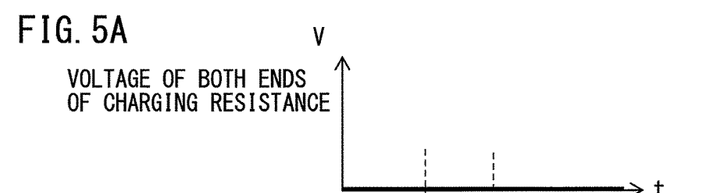
FIG. 5A is a view for explaining a relationship between a potential difference between both ends of a charging resistance and a potential difference between both ends of a DC link capacitor in a case in which the motor driving device illustrated in FIG. 4 normally drives a motor, and FIG. 5A indicates the potential difference between both of the ends of the charging resistance.
Figure 5B:
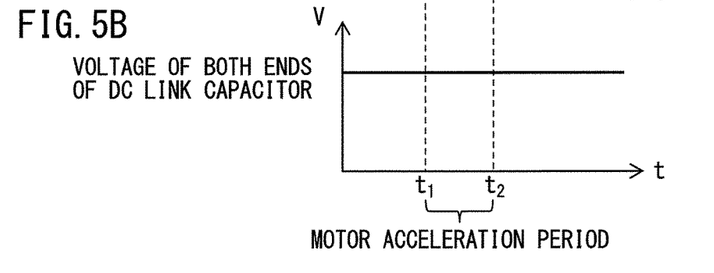
FIG. 5B is a view for explaining a relationship between a potential difference between both of the ends of the charging resistance and a potential difference between both of the ends of the DC link capacitor in a case in which the motor driving device illustrated in FIG. 4 normally drives the motor, and FIG. 5B indicates the potential difference between both of the ends of the DC link capacitor.

FIG. 5A is a view for explaining a relationship between a potential difference between both ends of a charging resistance and a potential difference between both ends of a DC link capacitor in a case in which the motor driving device illustrated in FIG. 4 normally drives a motor, and FIG. 5A indicates the potential difference between both of the ends of the charging resistance. FIG. 5B is a view for explaining a relationship between a potential difference between both of the ends of the charging resistance and a potential difference between both of the ends of the DC link capacitor in a case in which the motor driving device illustrated in FIG. 4 normally drives the motor, and FIG. 5B indicates the potential difference between both of the ends of the DC link capacitor. When the motor driving device 1000 accelerates the motor 2 between a time $t_1$ and a time $t_2$ using motor supply current having a magnitude suitable for the capacitance of the DC link capacitor 113 after the completion of the initial charge of the DC link capacitor 113, the switch 121 in the initial charging circuit 114 is closed to short-circuit both of the ends of the charging resistance 122. Therefore, no direct current flows through the charging resistance 122. Thus, no potential difference occurs between both of the ends of the charging resistance 122 as indicated in FIG. 5A, and a state in which the direct current voltage of the direct current output side of the converter 111 is applied to the DC link capacitor 113 on an as-is basis as indicated in FIG. 5B is achieved. Hereinafter, "motor supply current having a magnitude suitable for capacitance" means "motor supply current at which driving of motor can be accurately controlled when set DC link capacitor capacitance is used". When the motor 2 is normally driven using motor supply current having a magnitude suitable for the capacitance of the DC link capacitor 113 as described above, no direct current flows through the charging resistance 122, and the charging resistance 122 generates no heat.

Figure 6:
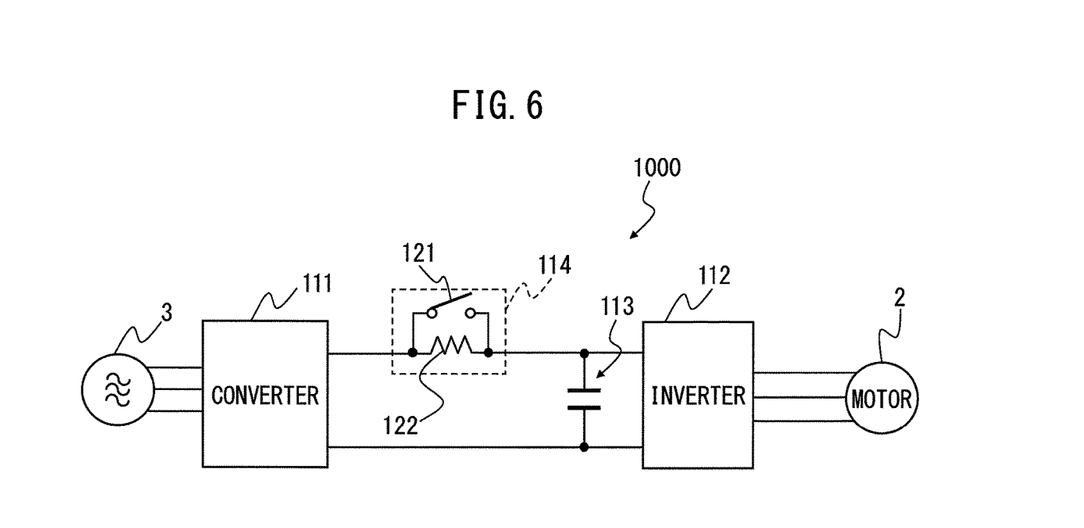
FIG. 6 is a view illustrating a motor driving device in which the switch in the initial charging circuit illustrated in FIG. 4 is failed, and the switch is opened even during the period of normal driving operation of a motor.
Figure 7A:
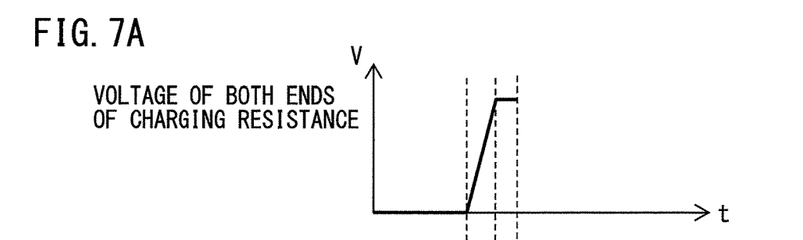
FIG. 7A is a view for explaining a relationship between a potential difference between both ends of a charging resistance and a potential difference between both ends of a DC link capacitor in the case of normally driving the motor using motor supply current having a magnitude suitable for the capacitance of the DC link capacitor in the motor driving device including the failed switch illustrated in FIG. 6, and indicates the potential difference between both of the ends of the charging resistance.
Figure 7B:
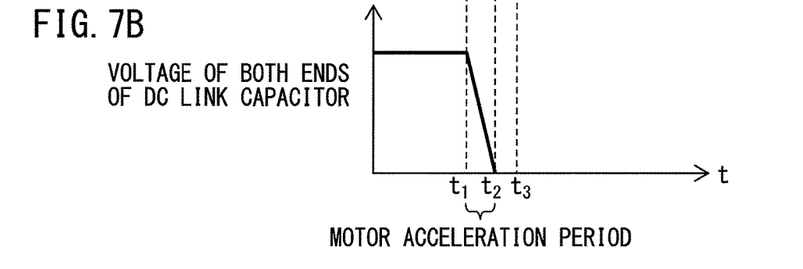
FIG. 7B is a view for explaining a relationship between a potential difference between both of the ends of the charging resistance and a potential difference between both of the ends of the DC link capacitor in the case of normally driving the motor using motor supply current having a magnitude suitable for the capacitance of the DC link capacitor in the motor driving device including the failed switch illustrated in FIG. 6, and indicates the potential difference between both of the ends of the DC link capacitor.

FIG. 6 is a view illustrating a motor driving device in which the switch in the initial charging circuit illustrated in FIG. 4 has failed, and the switch is opened even during the period of the normal driving operation of a motor. FIG. 7A is a view for explaining a relationship between a potential difference between both ends of a charging resistance and a potential difference between both ends of a DC link capacitor in the case of normally driving the motor using motor supply current having a magnitude suitable for the capacitance of the DC link capacitor in the motor driving device including the broken-down switch illustrated in FIG. 6, and indicates the potential difference between both of the ends of the charging resistance. FIG. 7B is a view for explaining a relationship between a potential difference between both of the ends of the charging resistance and a potential difference between both of the ends of the DC link capacitor in the case of normally driving the motor using motor supply current having a magnitude suitable for the capacitance of the DC link capacitor in the motor driving device including the failed switch illustrated in FIG. 6, and indicates the potential difference between both of the ends of the DC link capacitor. When the switch 121 in the initial charging circuit 114 has failed and thus opened as illustrated in FIG. 6 during a normal operation period during which the motor driving device 1000 drives the motor 2 after completion of the initial charge of the DC link capacitor 113, direct current flows through the charging resistance 122 even during the period of the normal driving operation of the motor 2. In such a case, acceleration of the motor 2 between a time $t_1$ and a time $t_2$ using motor supply current having a magnitude suitable for the capacitance of the DC link capacitor 113 results in occurrence of a potential difference between both of the ends of the charging resistance 122 as indicated in FIG. 7A, in a sharp drop in the voltage of both of the ends of the DC link capacitor 113 as indicated in FIG. 7B, and in immediate alarm-stopping of the motor driving device 1000 (time $t_3$). Normally, a time before the alarm-stopping (i.e., between time $t_1$ and time $t_3$) is extremely short, and therefore abnormal heat generation does not occur in the charging resistance 122.

Figure 8A:
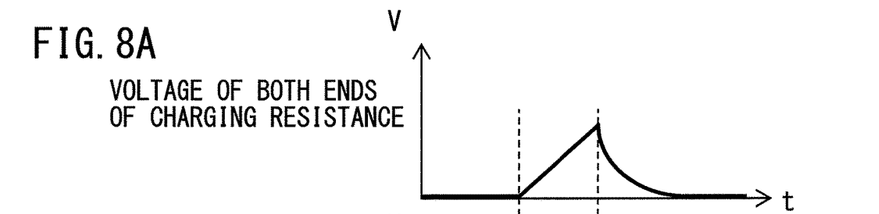
FIG. 8A is a view for explaining a relationship between a potential difference between both of the ends of the charging resistance and a potential difference between both of the ends of the DC link capacitor in the case of driving the motor using motor supply current that is low with respect to the capacitance of the DC link capacitor in the motor driving device including the failed switch illustrated in FIG. 6, and indicates the potential difference between both of the ends of the charging resistance.
Figure 8B:
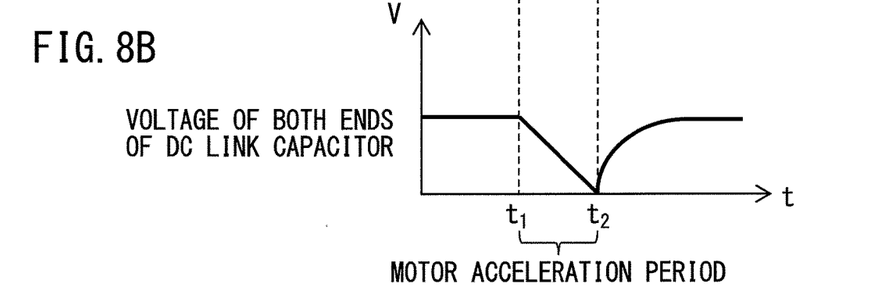
FIG. 8B is a view for explaining a relationship between a potential difference between both of the ends of the charging resistance and a potential difference between both of the ends of the DC link capacitor in the case of driving the motor using motor supply current that is low with respect to the capacitance of the DC link capacitor in the motor driving device including the failed switch illustrated in FIG. 6, and indicates the potential difference between both of the ends of the DC link capacitor.

FIG. 8A is a view for explaining a relationship between a potential difference between both of the ends of the charging resistance and a potential difference between both of the ends of the DC link capacitor in the case of driving the motor using motor supply current that is low with respect to the capacitance of the DC link capacitor in the motor driving device including the broken-down switch illustrated in FIG. 6, and indicates the potential difference between both of the ends of the charging resistance. FIG. 8B is a view for explaining a relationship between a potential difference between both of the ends of the charging resistance and a potential difference between both of the ends of the DC link capacitor in the case of driving the motor using motor supply current that is low with respect to the capacitance of the DC link capacitor in the motor driving device including the failed switch illustrated in FIG. 6, and indicates the potential difference between both of the ends of the DC link capacitor. When the switch 121 in the initial charging circuit 114 is failed and thus opened as illustrated in FIG. 6 during a normal operation period during which the motor driving device 1000 drives the motor 2 after the completion of the initial charge of the DC link capacitor 113, acceleration of the motor 2 between a time $t_1$ and a time $t_2$ using motor supply current that is low with respect to the capacitance of the DC link capacitor 113 results in flow of direct current through the charging resistance 122, in generation of a potential difference between both of the ends of the charging resistance 122 as indicated in FIG. 8A, and in a sharp drop in the voltage of both of the ends of the DC link capacitor 113 as indicated in FIG. 8B. Alarm-stopping of the motor driving device 1000 does not occur, and the motor driving device 1000 carries out normal driving operation during the period of the acceleration of the motor between the time $t_1$ and the time $t_2$. However, occurrence of abnormality is determined when a state in which a potential difference occurs between both of the ends of the charging resistance 122 continues for a given time in the technology according to Japanese Unexamined Patent Publication No. H08-317660.

A technology such as that according to Japanese Unexamined Patent Publication No. H09-140051 has a drawback in that disposition of a current sensor that monitors current flowing through a charging resistance is necessary for detecting abnormal heat generation in a charging resistance in an initial charging circuit, and thus cost is increased.

In the technology according to Japanese Unexamined Patent Publication No. H08-317660, even when a switch in an initial charging circuit is closed to short-circuit both ends of a charging resistance during a normal operation period during which a motor driving device drives a motor after the completion of the initial charge of a DC link capacitor, a potential difference occurs between both of the ends of the charging resistance in the initial charging circuit depending on a combination of the magnitude of alternating current supplied to the motor (hereinafter simply referred to as "motor supply current") and the capacitance of the DC link capacitor, and it is thus possible misdetection of "occurrence of abnormal heat generation in charging resistance" to occur, although no current is flowing though the charging resistance. This will be described in more detail with reference to FIG. 9A and FIG. 9B.

Figure 9A:
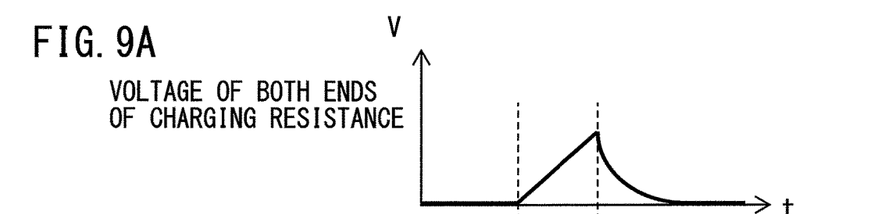
FIG. 9A is a view for explaining a relationship between a potential difference between both of the ends of the charging resistance and a potential difference between both of the ends of the DC link capacitor in the case of driving the motor using motor supply current that is high with respect to the capacitance of the DC link capacitor in the motor driving device including the not-failed switch illustrated in FIG. 4, and indicates the potential difference between both of the ends of the charging resistance.
Figure 9B:
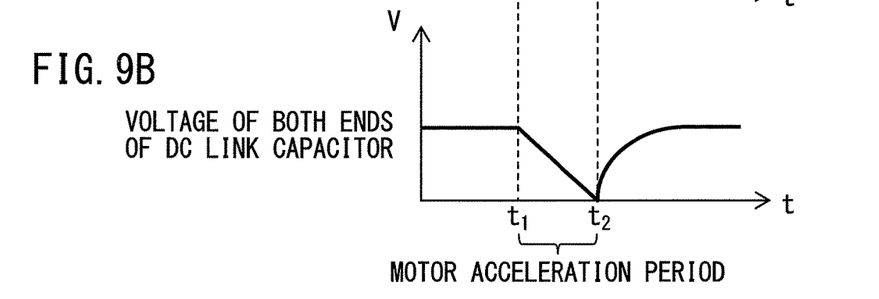
FIG. 9B is a view for explaining a relationship between a potential difference between both of the ends of the charging resistance and a potential difference between both of the ends of the DC link capacitor in the case of driving the motor using motor supply current that is high with respect to the capacitance of the DC link capacitor in the motor driving device including the not-failed switch illustrated in FIG. 4, and indicates the potential difference between both of the ends of the DC link capacitor.

FIG. 9A is a view for explaining a relationship between a potential difference between both of the ends of the charging resistance and a potential difference between both of the ends of the DC link capacitor in the case of driving the motor using motor supply current that is high with respect to the capacitance of the DC link capacitor in the motor driving device including the not-failed switch illustrated in FIG. 4, and indicates the potential difference between both of the ends of the charging resistance. FIG. 9B is a view for explaining a relationship between a potential difference between both of the ends of the charging resistance and a potential difference between both of the ends of the DC link capacitor in the case of driving the motor using motor supply current that is high with respect to the capacitance of the DC link capacitor in the motor driving device including the not-broken-down switch illustrated in FIG. 4, and indicates the potential difference between both of the ends of the DC link capacitor. When the motor driving device 1000 accelerates the motor 2 between a time $t_1$ and a time $t_2$ using motor supply current that is high with respect to the capacitance of the DC link capacitor 113 after completion of the initial charge of the DC link capacitor 113, the switch 121 in the initial charging circuit 114 is closed to short-circuit both of the ends of the charging resistance 122, and therefore no direct current flows through the charging resistance 122, thus preventing abnormal heat generation from occurring in the charging resistance 122. However, in order for the inverter 112 to supply high motor supply current to the motor 2 so as to accelerate the motor 2, it is necessary to discharge large direct current power from the DC link capacitor 113 having a low capacitance and to supply the large direct current power to the inverter 112. Thus, the voltage of both of the ends of the DC link capacitor 113 drops as indicated in FIG. 9B. According to Kirchhoff's Law, a drop in the power of the DC link capacitor 113 appears as a potential difference between both of the ends of the charging resistance 122. As a result, misdetection of "occurrence of abnormal heat generation in charging resistance" occurs, although no direct current is flowing though the charging resistance 122 in the technology according to Japanese Unexamined Patent Publication No. H08-317660, in which abnormally is determined based on the potential difference between both of the ends of the charging resistance 122.

SUMMARY OF INVENTION

An object of the present invention is to provide a motor driving device that can accurately detect occurrence of abnormal heat generation in an initial charging circuit that charges a DC link capacitor, in view of the problems described above.

In order to actualize the above-described object, the motor driving device includes: a converter that converts alternating current power supplied from an alternating current power source side so as to output direct current power; a DC link capacitor provided for a DC link which is in the direct current output side of the converter; an inverter that converts direct current power in the DC link to output alternating current power for driving a motor; an initial charging circuit that is provided for the DC link and charges the DC link capacitor with direct current power output by the converter; a potential difference occurrence determination unit that determines whether or not a potential difference occurs between both ends of the initial charging circuit; a direct current detecting unit that detects direct current supplied from the converter to the initial charging circuit; an alternating current detecting unit that detects alternating current supplied from the inverter to a motor; and an abnormality determination unit that determines that abnormal heat generation occurs in the initial charging circuit when the direct current detecting unit detects generation of direct current and the alternating current detecting unit detects generation of alternating current, in a case in which the potential difference occurrence determination unit determines that a potential difference occurs between both of the ends of the initial charging circuit.

The initial charging circuit includes: a charging resistance; and a switch that is connected in parallel to the charging resistance to short-circuit both ends of the charging resistance when the switch is closed, and charges the DC link capacitor with direct current that is allowed to flow from the converter through the charging resistance by opening the switch.

BRIEF DESCRIPTION OF THE DRAWINGS

The present invention will be more clearly understood by referring to the following accompanying drawings.

DETAILED DESCRIPTION

A motor driving device including means for detecting abnormal heat generation in an initial charging circuit will be described below with reference to the drawings. However, it should be understood that the present invention is not limited to the drawings or embodiments described below.

Figure 1:
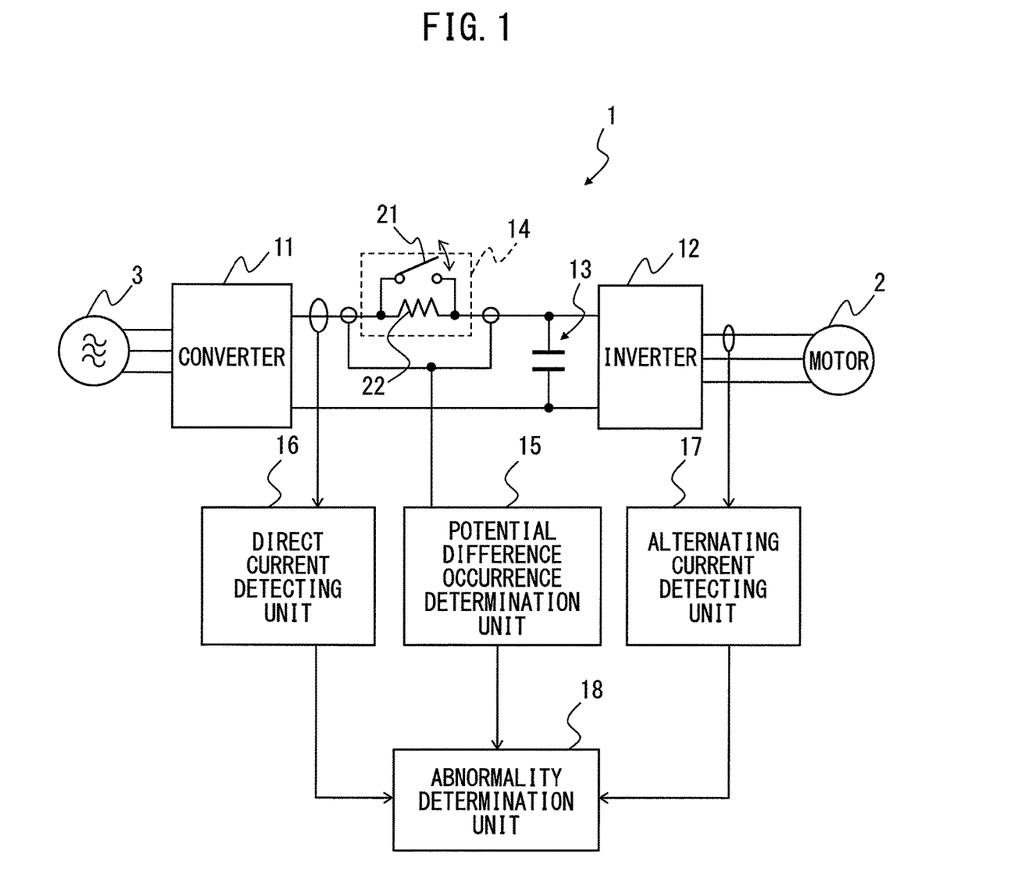
FIG. 1 is a principal block diagram of a motor driving device according to an example.

FIG. 1 is a principal block diagram of a motor driving device according to an example. The motor driving device 1 that controls driving of one three-phase motor 2 will be described. However, the present invention is not particularly limited by the number of motors 2 the driving of which is controlled by the motor driving device 1, and thus motor 2 may be more than one in number. The present invention is also not particularly limited by the kind of motor 2 driven by the motor driving device, and the motor 2 may be, for example, an induction motor or a synchronous motor. Further, the present invention is not particularly limited by the number of the phases of the motor 2, and the motor 2 may be, for example, a single-phase motor or another polyphase motor, as well as a three-phase motor.

The motor driving device 1 includes a converter 11, an inverter 12, a DC link capacitor 13, an initial charging circuit 14, a potential difference occurrence determination unit 15, a direct current detecting unit 16, an alternating current detecting unit 17, and an abnormality determination unit 18. An alternating current power source 3 is connected to the alternating current input side of the motor driving device 1, and the motor 2 is connected to the alternating current motor side of the motor driving device 1. In FIG. 1, illustration of a control system for driving the motor 2 is omitted for simplified explanation.

The converter 11 converts (rectifies) alternating current power supplied from the alternating current input side provided with the alternating current power source 3, and outputs direct current power to a DC link which is in a direct current output side. In the present invention, an embodiment of the converter 11 used is not particularly limited, and may be, for example, a diode rectification circuit, a PWM-controlled rectification circuit including a semiconductor switching element therein, or the like. When the converter 11 is a PWM-controlled rectification circuit, it includes a bridge circuit of a semiconductor switching element and a diode connected in antiparallel to the semiconductor switching element. Examples of the semiconductor switching element include IGBTs, thyristors, gate turn-off thyristors (GTOs), and transistors. However, the present invention is not limited by the kind of semiconductor switching element, and may be any kind of semiconductor switching element.

The inverter 12 is connected to the converter 11 through the DC link, and includes a bridge circuit of a semiconductor switching element and a diode connected in antiparallel to the semiconductor switching element in, for example, a PWM invertor or the like. The inverter 12 converts direct current power in the DC link to output alternating current power for driving a motor. More specifically, the inverter 12 carries out switching operation of the internal switching element based on a motor driving command received from a high-order control device (not illustrated) to convert direct current power supplied from a DC link side into alternating current power having a desired voltage and a desired frequency for driving the motor 2. The motor 2 is operated based on the supplied alternating current power having a variable voltage and a variable frequency. Regenerative power is generated when the motor 2 is braked. In this case, based on a motor driving command received from the high-order control device, alternating current power which is the regenerative power generated in the motor 2 can be converted into direct current power, and the direct current power can be returned to the DC link. When driving of a plurality of such motors 2 is controlled in the motor control device 1, such inverters 12 of which the number is equal to the number of the motors 2 are connected in parallel in order to individually supply driving power to each motor 2 to control the driving of the motors 2. Examples of the semiconductor switching element included in the bridge circuit in the inverter 12 include IGBTs, thyristors, gate turn-off thyristors (GTOs), and transistors. However, the present invention is not limited by the kind of semiconductor switching element, and may be any kind of semiconductor switching element.

The DC link capacitor 13 is provided for the DC link that connects the direct current output side of the converter 11 and the direct current input side of the inverter 12 to each other. The DC link capacitor 13 not only has the function of suppressing the pulsating component of the direct current output of the converter 11 or the inverter 12, but also the function of temporarily accumulating direct current power output from the converter 11 or the inverter 12. The initial charging circuit 14 carries out initial charge of the DC link capacitor 13 with direct current power output from the converter 11 after starting up the motor control device 1 and before starting control of actually driving a motor. FIG. 1 illustrates an example in which one inverter 12 is disposed. However, when, for example, plural inverters 12 are connected in parallel, each of such DC link capacitors 13 is provided for the direct current input side of each inverter 12, and therefore the DC link capacitors 13 are also connected in parallel with each other.

The initial charging circuit 14 is also provided for the DC link, and includes: a charging resistance 22; and a switch 21 that is connected in parallel to the charging resistance 22 to short-circuit both ends of the charging resistance 22 when the switch is closed, and charges the DC link capacitor 13 with direct current that is allowed to flows from the converter 11 through the charging resistance 22 by opening the switch 21 before starting driving of the motor 2 (i.e., before starting power conversion operation by inverter 12). In other words, the switch 21 is opened (turned off) only during the period of the initial charge of the DC link capacitor 13 immediately after starting up the motor driving device 1, and is maintained in the state of being closed (turned on) during the period of normal operation in which the motor driving device 1 drives the motor 2. More specifically, direct current output from the converter 11 is allowed to flow into the DC link capacitor 13 through the charging resistance 22 so as to charge the DC link capacitor 13 by opening (turning off) the switch 21 during the period of the initial charge immediately after starting up the motor driving device 1 and before starting the driving of the motor 2. When the DC link capacitor 13 is charged to a predetermined voltage, the switch 21 is closed (turned on) to short-circuit both of the ends of the charging resistance 22 and to complete initial charge operation. Then, the inverter 12 starts power conversion operation to supply driving power to the motor 2 and to drive the motor 2 based on the driving power. Examples of the switch 21 include semiconductor switches such as FETs, transistors, and IGBTs, and mechanical switches such as electro-magnetic contactors and relays.

The potential difference occurrence determination unit 15 determines whether or not a potential difference occurs between both ends of the initial charging circuit 14, i.e., both ends of the charging resistance 22. The potential difference between both of the ends of the initial charging circuit 14 may be measured directly by a voltage sensor, or may be determined from the difference between the direct current voltage of the direct current output side of the converter 11, obtained by calculation from the line-to-line voltage (or phase voltage) of the commercial three-phase alternating current power source 3 which is in the alternating current input side of the converter 11, and the voltage of the DC link capacitor 13, measured by the voltage sensor. It is not necessary for the potential difference occurrence determination unit 15 to acquire the potential difference between both of the ends of the charging resistance 22 as a specific numerical value. However, it is preferable that the potential difference occurrence determination unit 15 be able to extract the determination result of the presence or absence of the occurrence of the potential difference between both of the ends of the charging resistance 22, with the obtained determination result being sent to the abnormality determination unit 18.

The direct current detecting unit 16 detects direct current supplied from the converter 11 to the initial charging circuit 14. The direct current supplied from the converter 11 to the initial charging circuit 14 may be measured directly by a current sensor, or may be determined by calculation based on the power current of alternating current flowing, into the converter, from the commercial three-phase alternating current power source 3 which is in the alternating current input side of the converter 11. It is not necessary for the direct current detecting unit 16 to acquire the direct current supplied from the converter 11 to the initial charging circuit 14 as a specific numerical value. However, it is preferable that the direct current detecting unit 16 be able to detect the occurrence of the direct current supplied from the converter 11 to the initial charging circuit 14, with the obtained detection result being sent to the abnormality determination unit 18.

The alternating current detecting unit 17 detects alternating current supplied from the inverter 12 to the motor 2 (i.e., motor supply current). It is preferable to measure the motor supply current, for example, by means of a current sensor. It is not necessary for the alternating current detecting unit 17 to acquire the motor supply current as a specific numerical value. However, it is preferable that the alternating current detecting unit 17 be able to detect generation of the motor supply current, with the obtained detection result being sent to the abnormality determination unit 18.

The abnormality determination unit 18 determines that abnormal heat generation occurs in the initial charging circuit 14 (i.e., charging resistance 22), when the direct current detecting unit 16 detects generation of direct current and the alternating current detecting unit 17 detects generation of alternating current, in the case where the potential difference occurrence determination unit 15 determines that a potential difference occurs both ends of the initial charging circuit 14 (i.e., both ends of charging resistance 22). The principle of operation of the abnormality determination unit 18 will be described with reference to FIG. 2A to FIG. 2C.

Figure 2A:
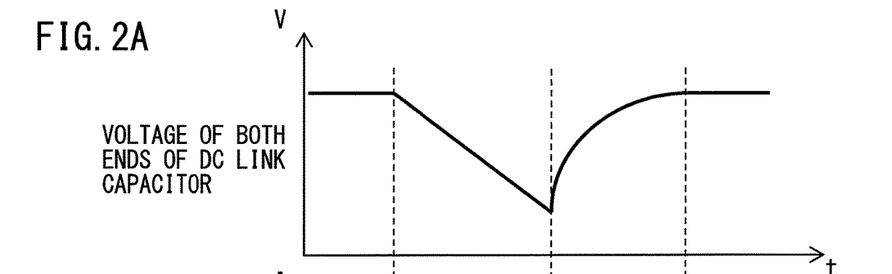
FIG. 2A is a view for explaining the principle of operation of an abnormality determination unit in the motor driving device according to the example, and indicates a potential difference between both ends of a DC link capacitor.
Figure 2B:
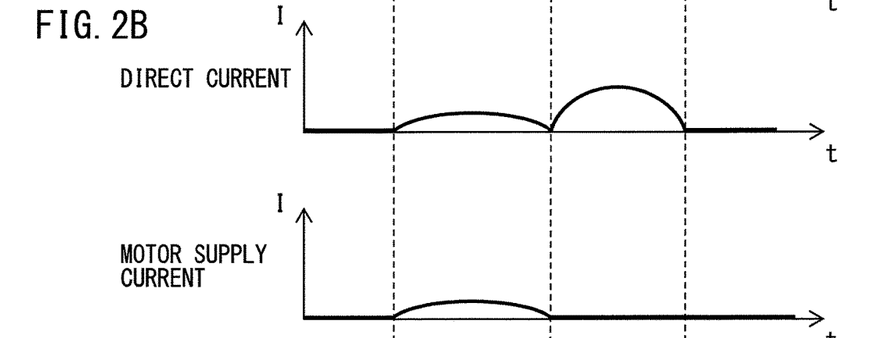
FIG. 2B is a view for explaining the principle of operation of the abnormality determination unit in the motor driving device according to the example, and indicates a relationship between direct current and motor supply current in the case of driving a motor using the motor supply current that is low with respect to the capacitance of the DC link capacitor in the motor driving device including a failed switch.
Figure 2C:
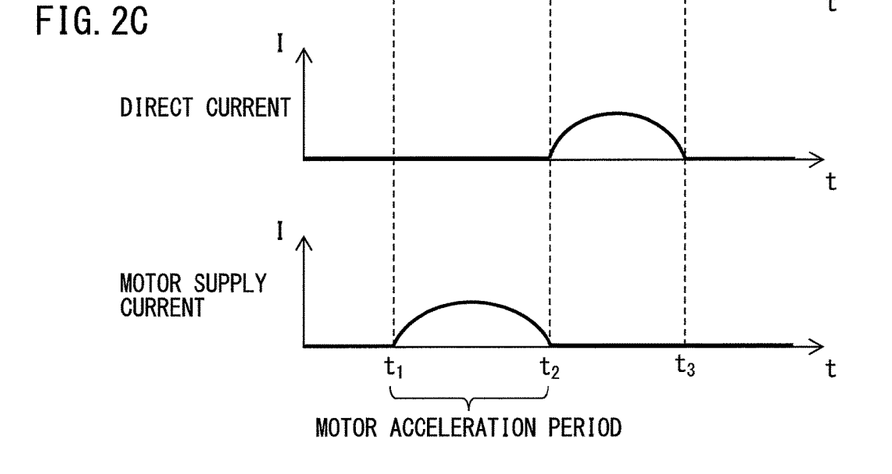
FIG. 2C is a view for explaining the principle of operation of the abnormality determination unit in the motor driving device according to the example, and indicates a relationship between direct current and motor supply current in the case of driving the motor using the motor supply current that is high with respect to the capacitance of the DC link capacitor in the motor driving device including a not-failed switch.

FIG. 2A is a view for explaining the principle of the operation of the abnormality determination unit in the motor driving device according to the example, and illustrates a potential difference between both of the ends of the DC link capacitor. FIG. 2B is a view for explaining the principle of the operation of the abnormality determination unit in the motor driving device according to the example, and illustrates a relationship between direct current and motor supply current in the case of driving the motor using the motor supply current that is low with respect to the capacitance of the DC link capacitor in the motor driving device including a broken-down switch. FIG. 2C is a view for explaining the principle of operation of the abnormality determination unit in the motor driving device according to the example, and illustrates a relationship between direct current and motor supply current in the case of driving the motor using the motor supply current that is high with respect to the capacitance of the DC link capacitor in the motor driving device including a not-broken-down switch.

As is clear from comparisons of FIG. 8A and FIG. 8B with FIG. 9A and FIG. 9B, waveforms in themselves representing potential differences between both ends of a charging resistance 22 during a motor acceleration period from a time $t_1$ to a time $t_2$ are the same in the case of driving a motor 2 using motor supply current that is low with respect to the capacitance of a DC link capacitor 113 in a motor driving device 1000 including a broken-down switch 121, and in the case of driving the motor 2 using motor supply current that is high with respect to the capacitance of the DC link capacitor 13 in the motor driving device 1000 including the not-broken-down switch 121. However, as already described, abnormal heat generation occurs in the charging resistance 122, due to direct current output from a converter 112 flowing through the charging resistance 122 in the case of FIG. 8A and FIG. 8B, while direct current output from the converter 112 flows through the closed switch 121, no current flows through the charging resistance 122, and abnormal heat generation does not occur in the case of FIG. 9. In the technology according to Japanese Unexamined Patent Publication No. H08-317660, misdetection of occurrence of abnormality occurs, even in the case of FIG. 9, as described above.

In the abnormality determination unit 18 in the motor driving device 1 according to this example, misdetection of occurrence of abnormality is not caused even in such a case as in FIG. 9. For example, when the switch 21 of the motor driving device 1 is failed and the switch 21 is opened during a normal driving operation period, the voltage of both ends of the DC link capacitor drops during the motor acceleration period from the time $t_1$ to the time $t_2$ as indicated in FIG. 2A, and therefore a potential difference occurs between both ends of the initial charging circuit 14 (i.e., both ends of charging resistance 22) according to Kirchhoff's Law, and direct current output from the converter 11 also flows through the charging resistance 22 simultaneously with flow of motor supply current as illustrated in FIG. 2B. In other words, the abnormality determination unit 18 determines that abnormal heat generation occurs in the initial charging circuit 14 (i.e., charging resistance 22) because the potential difference occurrence determination unit 15 determines that the potential difference occurs between both of the ends of the initial charging circuit 14 (i.e., both ends of charging resistance 22), the direct current detecting unit 16 detects the generation of direct current, and the alternating current detecting unit 17 detects the generation of the motor supply current (alternating current) simultaneously with the detection of the generation of the direct current. In contrast, when the switch 21 of the motor driving device 1 is not failed and the switch 21 is closed during the normal driving operation period, the voltage of both of the ends of the DC link capacitor drops as indicated in FIG. 2A during the motor acceleration period from the time $t_1$ to the time $t_2$, and therefore, a potential difference occurs between both of the ends of the initial charging circuit 14 (i.e., both ends of charging resistance 22) according to Kirchhoff's law, while direct current output from the converter 11 does not flow through the charging resistance 22 although motor supply current flows as indicated in FIG. 2C. In other words, the abnormality determination unit 18 does not determine that abnormal heat generation occurs in the initial charging circuit 14 (i.e., charging resistance 22) because the direct current detecting unit 16 does not detect generation of direct current although the potential difference occurrence determination unit 15 determines that a potential difference occurs between both of the ends of the initial charging circuit 14 (i.e., both ends of charging resistance 22). As described above, such misdetection of abnormality as occurs in the technology according to Japanese Unexamined Patent Publication No. H08-317660 does not occur in this example.

Figure 3:
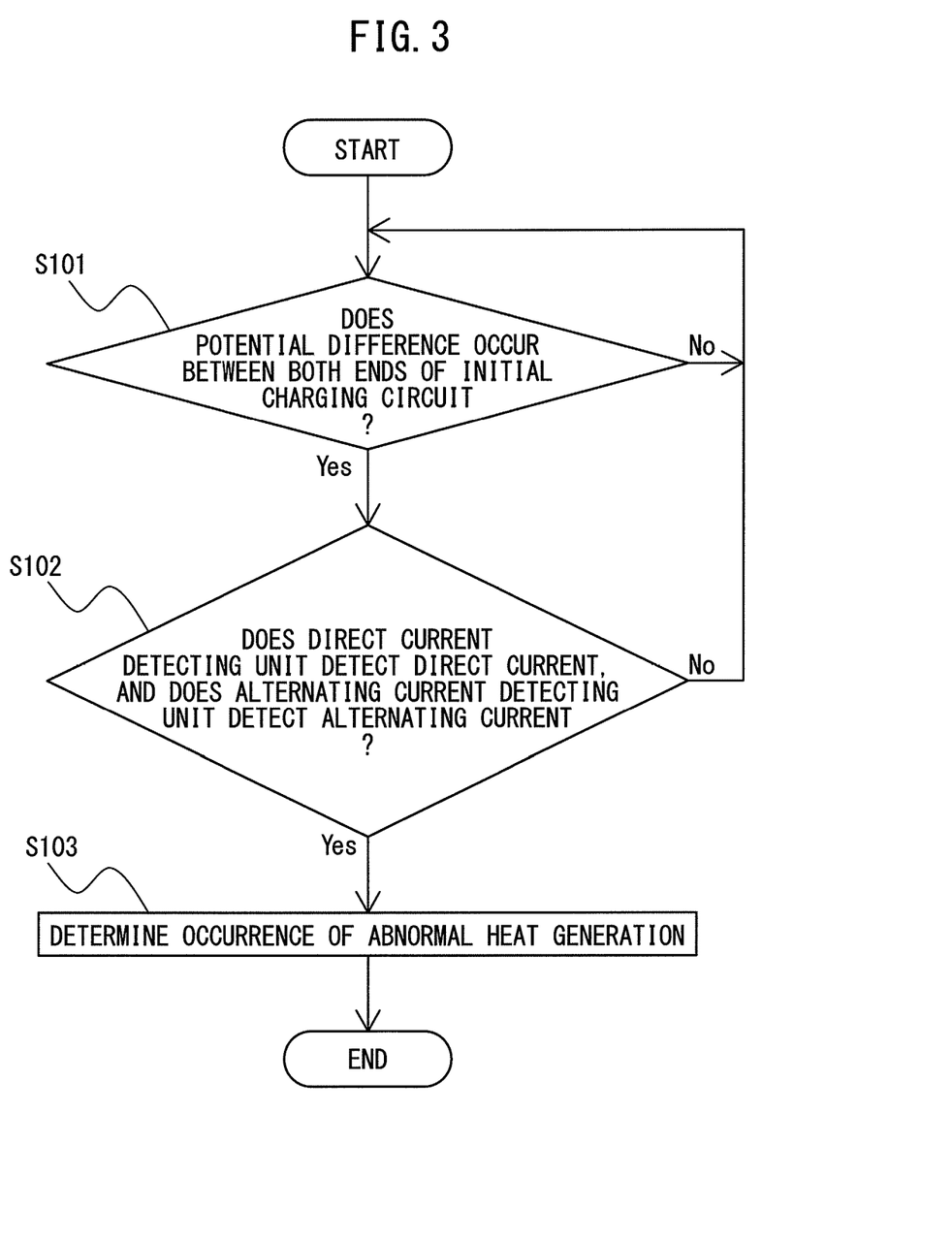
FIG. 3 is a flowchart illustrating the operation flow of the motor driving device according to the example.

FIG. 3 is a flowchart representing the operation flow of the motor driving device according to the example.

When the motor control device 1 starts control of actually driving the motor 2 after the completion of the initial charge operation of the DC link capacitor 13 by the initial charging circuit 14, first, in step S101, the potential difference occurrence determination unit 15 determines whether or not a potential difference occurs between both of the ends of the initial charging circuit 14, i.e., both of the ends of the charging resistance 22. If it is determined that the potential difference occurs between both of the ends of the initial charging circuit 14, the processing proceeds to step S102.

In step S102, the abnormality determination unit 18 determines whether or not detection of generation of direct current by the direct current detecting unit 16 and detection of generation of motor supply current by the alternating current detecting unit 17 are simultaneously carried out. If the detection of the generation of the direct current by the direct current detecting unit 16 and the detection of the generation of the motor supply current by the alternating current detecting unit 17 are simultaneously carried out, the processing proceeds to step S103.

In step S103, the abnormality determination unit 18 determines that abnormal heat generation occurs in the initial charging circuit 14 (i.e., charging resistance 22).

As described above, occurrence of abnormal heat generation in the initial charging circuit 14 can be accurately detected regardless of a combination of the magnitude of alternating current supplied to the motor 2 and the capacitance of the DC link capacitor 13, in this example.

In accordance with the present invention, there can be actualized a motor driving device that can accurately detect occurrence of abnormal heat generation in an initial charging circuit that charges a DC link capacitor. In other words, in accordance with the present invention, the occurrence of the abnormal heat generation in the initial charging circuit can be accurately detected regardless of a combination of the magnitude of alternating current supplied to a motor and the capacitance of the DC link capacitor, since it is determined that abnormal heat generation occurs in the initial charging circuit when generation of direct current flowing from a converter to the initial charging circuit and generation of motor supply current are simultaneously detected in a case in which a potential difference between both ends of a charging resistance in the initial charging circuit, direct current flowing from the converter to the initial charging circuit, and the motor supply current are monitored, and the potential difference occurs between both of the ends of the charging resistance.

What is claimed is:
1. A motor driving device, comprising:
a converter that converts alternating current power supplied from an alternating current power source side to output direct current power;
a DC link capacitor provided for a DC link which is in a direct current output side of the converter;
an inverter that converts direct current power in the DC link to output alternating current power for driving a motor;
an initial charging circuit that is provided for the DC link and charges the DC link capacitor with direct current power output by the converter;

a potential difference occurrence determination unit that determines whether or not a potential difference occurs between both ends of the initial charging circuit;

a direct current detecting unit that detects direct current supplied from the converter to the initial charging circuit;

an alternating current detecting unit that detects alternating current supplied from the inverter to a motor; and an abnormality determination unit that determines that abnormal heat generation occurs in the initial charging circuit when the direct current detecting unit detects generation of direct current and the alternating current detecting unit detects generation of alternating current, in a case in which the potential difference occurrence determination unit determines that a potential difference occurs between both of the ends of the initial charging circuit.

2. The motor driving device according to claim 1, wherein the initial charging circuit comprises: a charging resistance; and a switch that is connected in parallel to the charging resistance to short-circuit both ends of the charging resistance when being closed, and the initial charging circuit charges the DC link capacitor with direct current that is allowed to flow from the converter through the charging resistance by opening the switch.

* * * * *